May 5, 1964 KOJI NAKAMURA 3,131,835
MOUTH LID MEANS OF IRIS STOP TYPE
Filed May 15, 1961
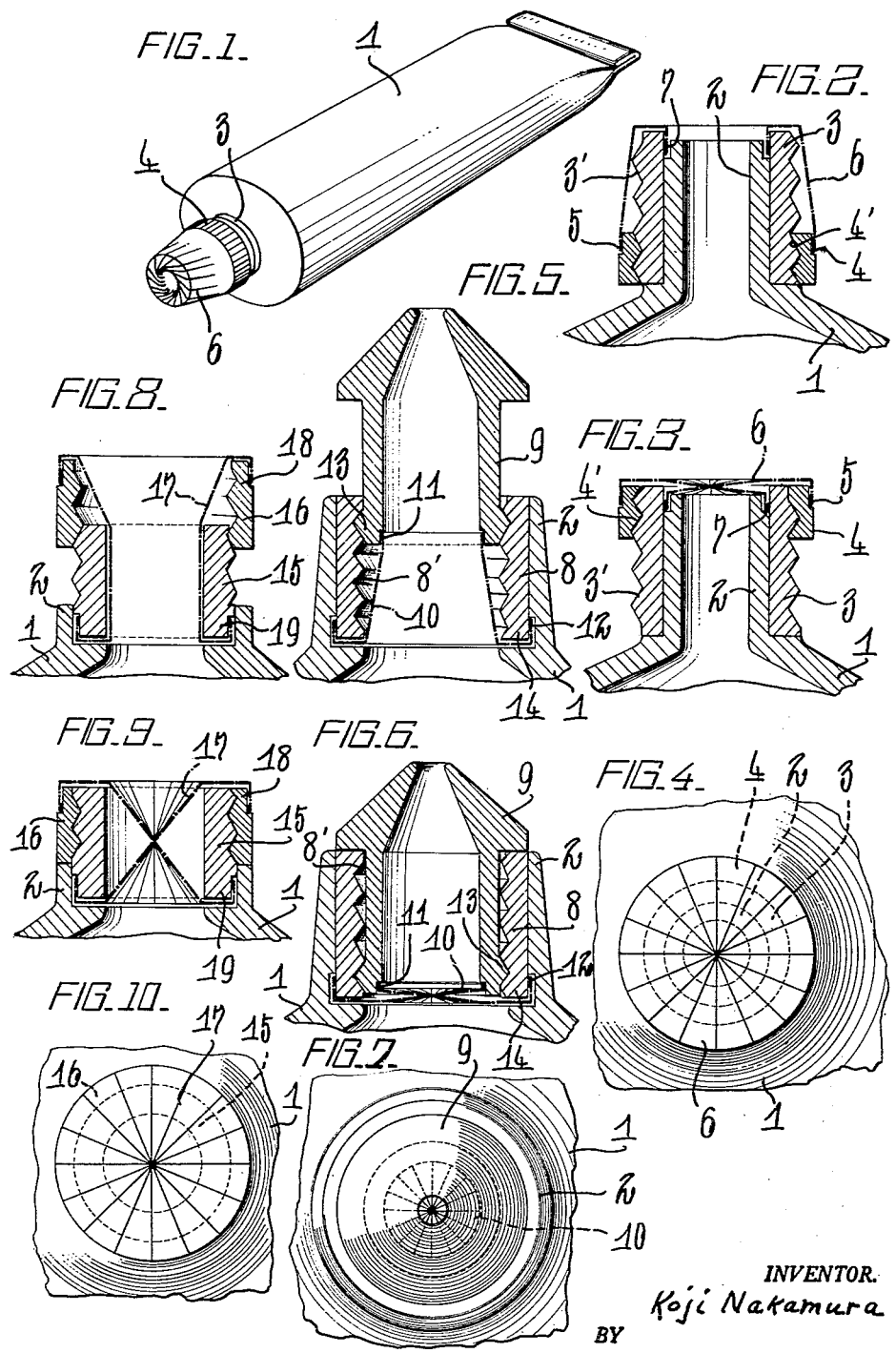
INVENTOR.
Koji Nakamura
BY
Stevens Davis Miller + Mosher
Attorneys

United States Patent Office 3,131,835
Patented May 5, 1964

3,131,835
MOUTH LID MEANS OF IRIS STOP TYPE
Koji Nakamura, 12-401 Ogikubo-Danchi, 1-571 Nishita-machi, Suginami-ku, Tokyo, Japan
Filed May 15, 1961, Ser. No. 110,216
Claims priority, application Japan Oct. 13, 1960
1 Claim. (Cl. 222—507)

The present invention relates to a cap valve for use in a container and the like and the cap valve comprises a fixed screw sleeve to be fitted to the mouth of a container, tube, vessel or others and a rotary screw sleeve to be screwed with it, and the rotary screw sleeve, while rotating, slides longitudinally in the axial direction of the fixed screw sleeve and both ends of a check squeezer formed of a strong plastic thin film are fixed between these screws, one end of the squeezer is rotated integrally with the rotary screw to be twisted in relation to the other fixed end, thereby the opening of the squeezer being thus contracted in area and closed, while the closed film squeezer is opened through the aforesaid rotation in the reverse direction of the rotary screw sleeve, the valve thus operates in the fashion of an iris diaphragm.

The features and objects of this invention will be made clear in the following description with reference to some embodiments of the present invention illustrated by accompanying drawings, in which:

FIG. 1 is a perspective view of a tube provided with a cap valve according to the present invention;

FIG. 2, a fragmentary sectional view of a tube with a cap valve of this invention showing the state of opening;

FIG. 3, a sectional view of the same cap valve showing the state of closing;

FIG. 4, a plan view of FIG. 3;

FIG. 5, a sectional elevation of another embodiment of a cap valve according to this invention showing the state of opening;

FIG. 6, a sectional elevation of the same as shown in a closed state;

FIG. 7, a plan view of FIG. 6;

FIG. 8, a sectional elevation of still another embodiment of a cap valve according to this invention showing the state of opening;

FIG. 9, a sectional elevation of the same as shown in a closed state;

FIG. 10, a plan view of FIG. 9.

In FIGS. 1, 2, 3 and 4, 1 is a container such as a squeeze tube, a bottle and the like, and it is provided with a fixed screw sleeve 3 to be fixed to its mouth 2. This fixed screw sleeve 3 can of course be constructed at the mouth 2 itself. The fixed screw sleeve 3 has a screw thread 3' and also a rotary screw sleeve 4 with an inside screw thread 4' to be engaged with this screw thread 3'. A cylindrical and flexible check valve 6 formed of a strong film for instance of polyethylene has its periphery of one end 5 fixed to this rotary screw sleeve 4 and also it has its periphery of the other end 7 fixed to the fixed screw sleeve 3 or the mouth 2.

Now, with the rotation of the rotary screw sleeve 4 this travels in the axial direction in relation to the fixed screw sleeve 3, and when the type of screw is so selected as a certain relativity may be maintained between the sum of rotation (in the peripheral direction in the drawings) on one point of fixation 5 by twisting brought about by this rotation and the sum of travelling (longitudinal in the drawings) of the rotary screw sleeve 4 by means of screw threads 3' and 4', the film valve 6 is twisted in a state of tension all through the rotation of the rotary screw sleeve 4. And the squeeze of the valve 6 due to this twisting is effected at the upper central portion of the mouth 2 to form a perfect closing as shown in FIGURES 3 and 4, while in closing operation the mother lines of the cylindrical valve 6 are gathered toward the central portion from the external periphery of the mouth and the caliber of the mouth is squeezed successively, that is, the degree of opening can be regulated freely.

Referring to FIGS. 5, 6 and 7, they show a modification of the cap valve according to the present invention in which a fixed screw sleeve 8 is fitted tightly in the mouth 2 of the container 1 and the sleeve 8 is provided with a screw thread 8' at its inside surface into which is screwed a rotary screw sleeve 9 which is adapted to move up and down longitudinally while being turned round. The upper and lower ends 11 and 12 are firmly attached to the bottoms 13 and 14 of the sleeves 9 and 8 respectively. When the movable sleeve 9 is screwed into the stationary sleeve 8 as shown in FIGS. 5 and 6, the flexible valve 10 will be twisted with rotation of the screw sleeve 9 so as to close the opening of the valve 10 at the lower and central part of the mouth 2. Accordingly the opening of the valve 10 will be easily adjusted by regulating the rotation of the sleeve 9.

Furthermore, another modification of the present invention is illustrated in FIGS. 8, 9 and 10 in which a stationary screw sleeve 15 is secured to the flange of the mouth 2 of the container 1 and a movable screw sleeve 16 is screwed on the screw sleeve 15. A cylindrical film valve 17 having flexibility is elongated along the inside wall of sleeves 15 and 16 as shown in FIG. 8 and is respectively attached to the upper and lower parts 18 and 19 of the sleeves 16 and 15 at the opposite ends of the valve 17.

In this construction, closing is effected at the middle and central part of the sleeve 15 as shown in X-shaped section of FIG. 9.

Hithertofore, there have been many kinds of opening and closing means, and the construction of a lid varies according to the kind of vessel or the uses intended, its operation being varied. For instance, the lid of a tube for toothpaste is of screw type and in its employment the lid must be removed, which might happen to be lost, and a vessel for seasonings has a lid provided with small perforations through which the contents are to be shaken out, but moisture often causes the perforations to be stopped up.

In the one according to the present invention, however, a lid need not be removed from the mouth of a vessel but a slight rotation of a rotary screw assures a free regulation of the opening degree from full opening to tight closing in accordance with the rotation degree. In a vessel, such as squeeze tube, containing a material of big viscosity, the material squeezed out can be cut away at the closing point, and it offers convenience, and being of very simple construction, it can be used in various kinds of vessels, and the closing and opening effect of it is very good and it can be offered at low price.

What is claimed is:

For use with a container having a mouth, a cap valve comprising a stationary screw sleeve fixed to the mouth of the container, a movable screw sleeve engaged with said stationary screw sleeve and a flexible non-extensible valve film having opposite ends fixedly attached to the ends of the stationary and movable screw sleeves respectively and rotating with said movable screw sleeve and forming a cylindrical shape in the state of opening and a closed iris at the mouth when closed.

References Cited in the file of this patent

UNITED STATES PATENTS

| | | |
|---|---|---|
| 1,431,918 | Arthur | Oct. 17, 1922 |
| 1,986,484 | Schleuter | Jan. 1, 1935 |
| 2,663,467 | Douglass et al. | Dec. 22, 1953 |
| 2,974,835 | Herbrick | Mar. 14, 1961 |